US012373284B2

(12) United States Patent
Yang (10) Patent No.: US 12,373,284 B2
(45) Date of Patent: Jul. 29, 2025

(54) METHOD FOR ACCESSING FLASH MEMORY MODULE AND ASSOCIATED FLASH MEMORY CONTROLLER AND ELECTRONIC DEVICE

(71) Applicant: Silicon Motion, Inc., Hsinchu County (TW)

(72) Inventor: Tsung-Chieh Yang, Hsinchu (TW)

(73) Assignee: Silicon Motion, Inc., Hsinchu County (TW)

( * ) Notice: Subject to any disclaimer, the term of this patent is extended or adjusted under 35 U.S.C. 154(b) by 16 days.

(21) Appl. No.: 18/621,069

(22) Filed: Mar. 28, 2024

(65) Prior Publication Data

US 2024/0403161 A1    Dec. 5, 2024

(30) Foreign Application Priority Data

Jun. 1, 2023    (TW) ................... 112120437

(51) Int. Cl.
    *G06F 11/10*    (2006.01)
(52) U.S. Cl.
    CPC ...... *G06F 11/1016* (2013.01); *G06F 11/1068* (2013.01)
(58) Field of Classification Search
    None
    See application file for complete search history.

(56) References Cited

U.S. PATENT DOCUMENTS

| | | | |
|---|---|---|---|
| 9,563,502 B1 * | 2/2017 | Alhussien | ........... G11C 11/5642 |
| 9,728,262 B2 | 8/2017 | Baran | |
| 11,675,655 B1 * | 6/2023 | Nguyen | ................. G06N 20/00 |
| | | | 714/6.11 |
| 12,107,603 B1 * | 10/2024 | Shende | .............. H03M 13/1125 |
| 2017/0125114 A1 * | 5/2017 | Alhussien | .......... H03M 13/1108 |
| 2017/0168894 A1 * | 6/2017 | Kim | ..................... G06F 11/1068 |
| 2017/0236592 A1 * | 8/2017 | Alhussien | ............ G11C 7/1006 |
| | | | 714/721 |
| 2018/0046527 A1 | 2/2018 | Reusswig | |

(Continued)

FOREIGN PATENT DOCUMENTS

TW    201823971 A    7/2018

OTHER PUBLICATIONS

J. Cui, Z. Zeng, J. Huang, W. Yuan and L. T. Yang, "Improving 3-D NAND SSD Read Performance by Parallelizing Read-Retry," in IEEE Transactions on Computer-Aided Design of Integrated Circuits and Systems, vol. 42, No. 3, pp. 768-780, Mar. 2023, (Year: 2023).*

*Primary Examiner* — Daniel F. McMahon
(74) *Attorney, Agent, or Firm* — Winston Hsu (57) ABSTRACT

The invention provides a method for accessing a flash memory module, wherein the method includes the steps of: classifying multiple read retry tables into at least a first group and a second group to establish a classifying and sorting table, wherein each of the multiple read retry tables records at least one reading voltage, and any two read retry tables do not have exactly the same reading voltage; selecting a first read retry table from the first group to read a page of a block of the flash memory module to generate first read data; and when a decoder fails to decode the first read data, selecting a second read retry table from the first group to read the page of the block of the flash memory module to generate second read data for the decoder to decode.

14 Claims, 8 Drawing Sheets

(56) References Cited

U.S. PATENT DOCUMENTS

| 2022/0011973 A1* | 1/2022 | Kim | G11C 29/42 |
| 2022/0171566 A1 | 6/2022 | Kim | |
| 2024/0211345 A1* | 6/2024 | Son | H03M 13/1177 |
| 2024/0281321 A1* | 8/2024 | Son | G06F 11/10 |

* cited by examiner

METHOD FOR ACCESSING FLASH MEMORY MODULE AND ASSOCIATED FLASH MEMORY CONTROLLER AND ELECTRONIC DEVICE

BACKGROUND OF THE INVENTION

1. Field of the Invention

The present invention relates to a flash memory, and more particularly, to a method for accessing a flash memory module and associated flash memory controller and electronic device.

2. Description of the Prior Art

With the development of low-density parity-check code (LDPC), an error correction code (ECC) circuit in a flash memory controller can perform the error correction operation on the data with higher bit error count or higher bit error rate to successfully decode the data. However, although the decoding capability of the ECC circuit has been improved, when the bit error count or the bit error rate is higher than a threshold value, the processing speed of the ECC circuit will be significantly reduced, for example, it will be reduced to about 20 million bytes per second (20 MB/s), thus seriously affecting system performance.

In order to solve the problem of the above-mentioned bit error count or bit error rate being too high, which leads to system performance degradation or even failure to successfully decode, the flash memory controller will use multiple read retry tables to use different reading voltages to read the flash memory module to obtain suitable data (i.e., data that can be successfully decoded or data with lower bit error count or lower bit error rate). In the operation of the prior art, when the flash memory controller uses a default read retry table to read the flash memory module, if the read data cannot be successfully decoded, the flash memory controller will sequentially select other read retry tables to read the flash memory module until the read data can be successfully decoded.

However, the status of the flash memory module will change with the storage time of the data, the current temperature, the temperature when the data is written, the erase count of the block, the read count block, etc., so the read retry table suitable for reading the flash memory module will also change accordingly, resulting in the flash memory controller may need to frequently adjust the default read retry table for use. In addition, since some of the above multiple read retry tables may be suitable for reading flash memory modules only under very special circumstances, if the flash memory controller sequentially selects these read retry tables to read the flash memory module, it will usually only cause subsequent decoding failures, thus affecting the overall performance.

SUMMARY OF THE INVENTION

It is therefore an objective of the present invention to provide a method for accessing a flash memory module and associated flash memory controller and electronic device, which can classify and sort multiple read retry tables, so that when decoding fails, the flash memory controller can first try the read retry table with a higher decoding success rate, to solve the problem described in the prior art.

According to one embodiment of the present invention, a flash memory controller is disclosed. The flash memory controller is configured to access a flash memory module, and the flash memory controller comprises a read-only memory configured to store a program code, a microprocessor configured to execute the program code to control access of the flash memory module, a decoder and a buffer memory. The buffer memory is configured to store multiple read retry tables, wherein each of the multiple read retry tables records at least one reading voltage, and any two read retry tables do not have exactly the same reading voltage. The microprocessor classifies the multiple read retry tables into at least a first group and a second group to establish a classifying and sorting table, wherein the first group comprise the read retry table(s) that are previously used to read the flash memory module to obtain read data, and the read data can be successfully decoded by the decoder; and the second group comprises the read retry table(s) that that are previously used to read the flash memory module to obtain read data, and the read data is failed to be successfully decoded by the decoder, and a syndrome or a syndrome weight generated during a decoding process of the decoder meets a first condition. The microprocessor selects a first read retry table from the first group to read a page of a block of the flash memory module to generate first read data, and when the decoder fails to decode the first read data, the microprocessor selects a second read retry table from the first group to read the page of the block of the flash memory module to generate second read data, for the decoder to decode.

According to one embodiment of the present invention, an electronic device comprising a flash memory module and a flash memory controller is disclosed. The flash memory controller is configured to access the flash memory module, wherein the flash memory controller comprises a decoder, the flash memory controller records multiple read retry tables, each of the multiple read retry tables records at least one reading voltage, and any two read retry tables do not have exactly the same reading voltage. The flash memory controller classifies the multiple read retry tables into at least a first group and a second group to establish a classifying and sorting table, wherein the first group comprise the read retry table(s) that are previously used to read the flash memory module to obtain read data, and the read data can be successfully decoded by the decoder; and the second group comprises the read retry table(s) that that are previously used to read the flash memory module to obtain read data, and the read data is failed to be successfully decoded by the decoder, and a syndrome or a syndrome weight generated during a decoding process of the decoder meets a first condition. The flash memory controller selects a first read retry table from the first group to read a page of a block of the flash memory module to generate first read data, and when the decoder fails to decode the first read data, the flash memory controller selects a second read retry table from the first group to read the page of the block of the flash memory module to generate second read data, for the decoder to decode.

According to one embodiment of the present invention, a method for accessing a flash memory module comprises the steps of: classifying multiple read retry tables into at least a first group and a second group to establish a classifying and sorting table, wherein each of the multiple read retry tables records at least one reading voltage, and any two read retry tables do not have exactly the same reading voltage; the first group comprise the read retry table(s) that are previously used to read the flash memory module to obtain read data, and the read data can be successfully decoded by a decoder; and the second group comprises the read retry table(s) that that are previously used to read the flash memory module to obtain read data, and the read data is failed to be successfully decoded by the decoder, and a syndrome or a syndrome weight generated during a decoding process of the decoder meets a first condition; selecting a first read retry table from the first group to read a page of a block of the flash memory module to generate first read data; and when the decoder fails to decode the first read data, selecting a second read retry table from the first group to read the page of the block of the flash memory module to generate second read data, for the decoder to decode.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
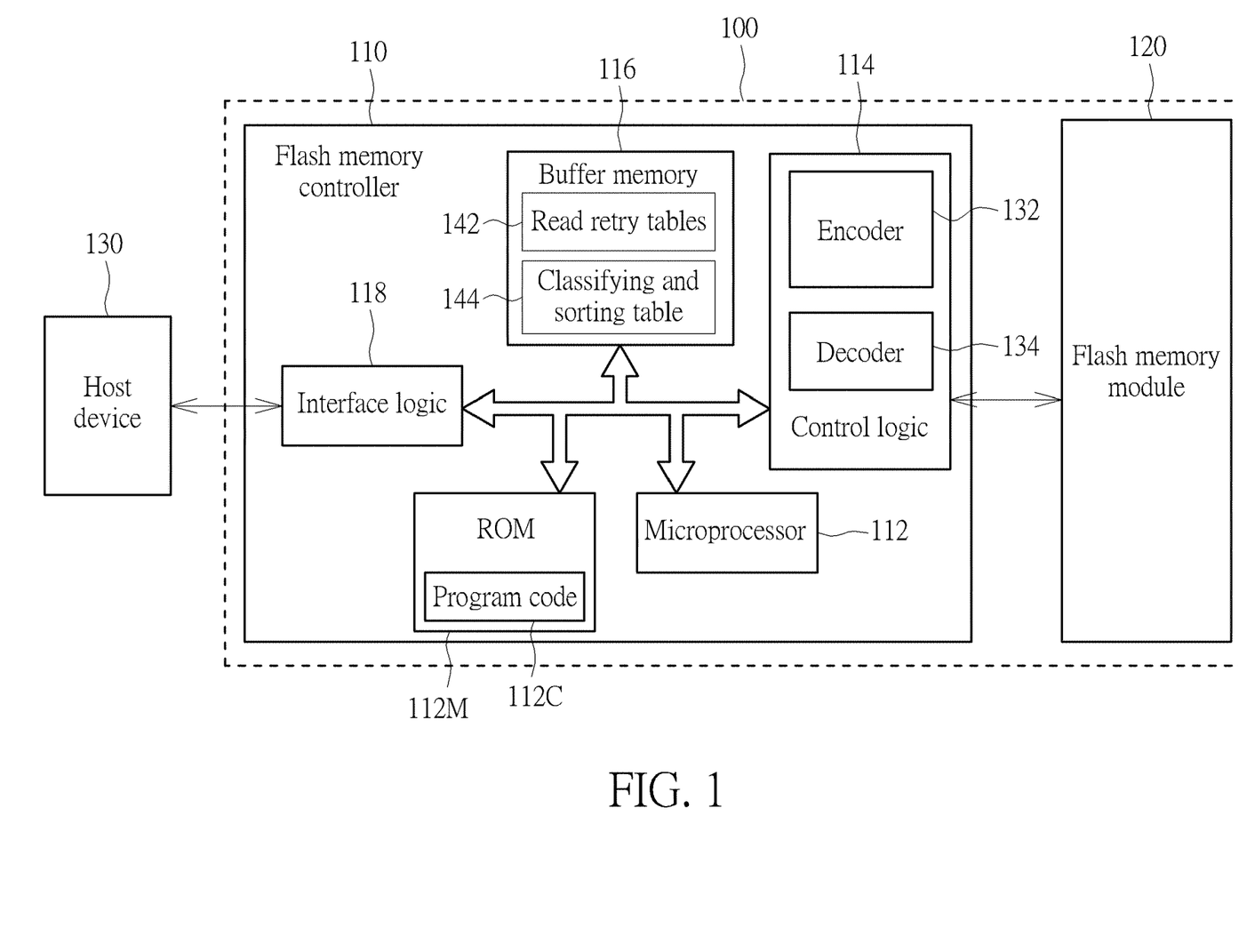
FIG. 1 is a diagram illustrating a memory device according to one embodiment of the present invention.

FIG. 1 is a diagram illustrating a memory device 100 according to one embodiment of the present invention. The memory device 100 comprises a flash memory module 120 and a flash memory controller 110, and the flash memory controller 110 is arranged to access the flash memory module 120. According to this embodiment, the flash memory controller 110 comprises a microprocessor 112, a read-only memory (ROM) 112M, a control logical 114, a buffer memory 116 and an interface logic 118. The ROM 112M is arranged to store a code 112C, and the microprocessor 112 is arranged to execute the code 112C to control accessing of the flash memory module 120. The control logical 114 comprises an encoder 132 and a decoder 134, wherein the encoder 132 is arranged to encode data to be written into the flash memory module 120 to generate corresponding parity code (also referred to as ECC), and the decoder 134 is arranged to decode the data read from the flash memory module 120.

In a typical situation, the flash memory module 120 may comprise multiple flash memory chips, each of the flash memory chips comprises multiple blocks, and the flash memory controller 110 may use "block" as the unit to perform data erasing operations on the flash memory module 120. Further, a block may record a specific amount of pages, wherein the flash memory controller 110 uses "page" as the unit to perform data writing operations on the flash memory module 120. In this embodiment, the flash memory module 120 is 3D NAND-type flash module.

In practice, the flash memory controller 110 for executing the code 112C via the microprocessor 112 may perform various control operations by utilizing its inner elements, e.g., utilizing the control logical 114 to control accessing of the flash memory module 120, utilizing the buffer memory 116 to perform necessary buffering, and utilizing the interface logic 118 to communicate with a host device 130. The buffer memory 116 is implemented with a random access memory (RAM). For example, the buffer memory 116 may be a static random access memory (Static RAM, or SRAM), but the present invention is not limited thereto.

In one embodiment, the memory device 100 may be a portable memory device (e.g. a memory card conforming to the SD/MMC, CF, MS, XD specifications), and the host device 130 may be an electronic device connectable to the memory device 100, such as a smartphone, laptop computer, desktop computer, and so on. In another embodiment, the memory device 100 may be a solid state drive (SSD) or a storage device that conforms to the Universal Flash Storage (UFS) or Embedded Multi Media Card (EMMC) specification that is installed in an electronic device, such as a smartphone, laptop computer, desktop computer and so on, while the host device 130 may be a processor of the electronic device.

Figure 2:
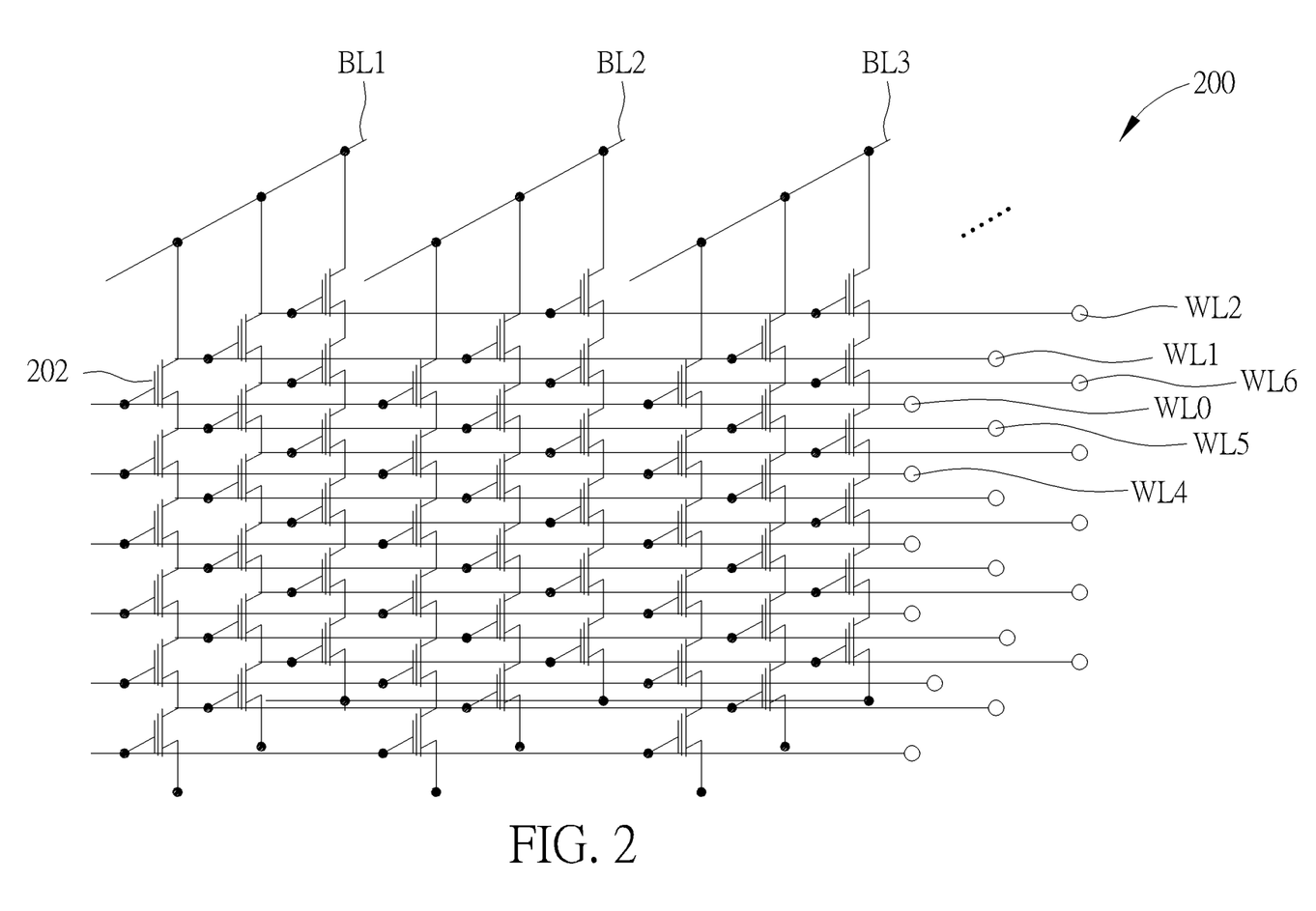
FIG. 2 is a block within a flash memory module according to one embodiment of the present invention.

FIG. 2 is a diagram illustrating a block 200 in the flash memory module 120 according to one embodiment of the present invention, wherein the flash memory module 120 may be a 3D NAND-type flash memory. As shown in FIG. 2, the block 200 comprises multiple memory units (e.g. the floating-gate transistor 202 or other charge trap element), which form the 3D NAND-type flash memory mechanism via multiple bit lines (e.g. the bit lines BL1-BL3 shown in the figure, but the present invention is not limited thereto) and word lines (e.g. the word lines WL0-WL2, WL4-WL6 shown in the figure). Take the uppermost plane in in FIG. 2 as example, all floating-gate transistors on the word line WL0 form at least one page, all floating-gate transistors on the word line WL1 form at least another page, and all floating-gate transistors on the word line WL2 further form yet at least another page, and so on. Further, due to different writing manners of the flash memory, the definition of the relationship between the word line WL0 and pages (i.e. logical pages) will also be different. Specifically, when writing with the single-level cell (SLC) technique, all floating-gate transistors on the word line WL0 are only corresponding to one single logical page; when writing with the multi-level cells (MLC) technique, all floating-gate transistors on the word line WL0 are corresponding to two logical pages; when writing with the triple-level cell (TLC) technique, all floating-gate transistors on the word line WL0 are corresponding to three logical pages; and when writing with the quad-level cell (QLC) technique, all floating-gate transistors on the word line WL0 are corresponding to four logical pages. Since one skilled in the art should be readily to understand the structure of the 3D NAND-type flash memory and the relationship between word lines and pages, the detailed descriptions are omitted here for brevity.

Figure 3:
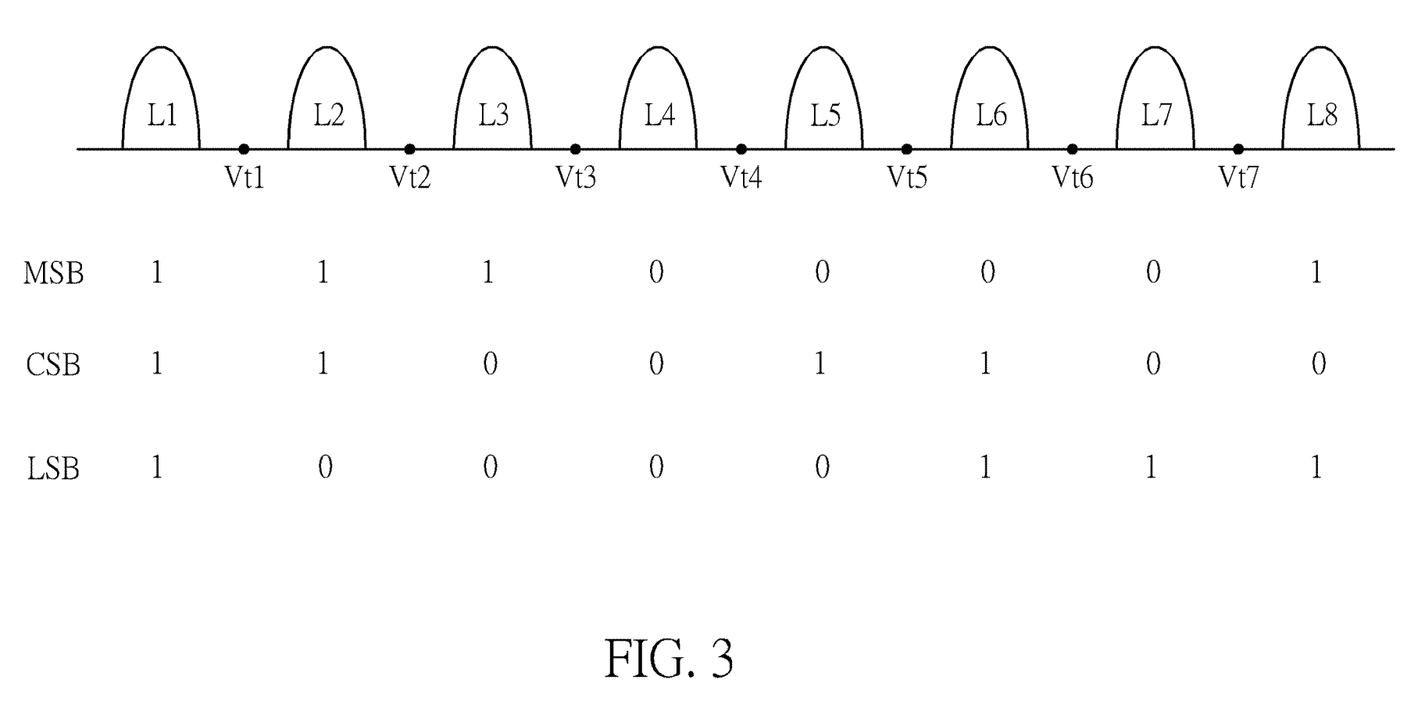
FIG. 3 is a diagram illustrating multiple writing voltage levels and multiple threshold voltages in a page.

FIG. 3 is a diagram illustrating multiple writing voltage levels L1-L8 and multiple threshold voltages Vt1-Vt7 when using a TLC block as the block 200. As shown in FIG. 3, each floating-gate transistor 202 may be programmed to have the writing voltage level L1 (i.e. (MSB, CSB, LSB)=(1, 1, 1)), the writing voltage level L2 (i.e. (MSB, CSB, LSB)=(1, 1, 0), the writing voltage level L3 (i.e. (MSB, CSB, LSB)=(1, 0, 0), the writing voltage level L4 (i.e. (MSB, CSB, LSB)=(0, 0, 0), the writing voltage level L5 (i.e. (MSB, CSB, LSB)=(0, 1, 0), the writing voltage level L6 (i.e. (MSB, CSB, LSB)=(0, 1, 1), the writing voltage level L7 (i.e. (MSB, CSB, LSB)=(0, 0, 1) or the writing voltage level L8 (i.e. (MSB, CSB, LSB)=(1, 0, 1)). When the memory controller 110 needs to read the least significant bit (LSB) in the floating-gate transistor 202, the flash memory controller 110 will use the reading voltages Vt1 and Vt5 to read the floating gate transistor 202, and refer to the conduction state of the floating gate transistor 202 (e.g. if any current is generated or not) to generate "1" or "0". Similarly, when the flash memory controller 110 needs to read the center significant bit (CSB), the flash memory controller 110 will use the reading voltages Vt2, Vt4 and Vt6 to read the floating gate transistor 202, and refer to the conduction state of the floating gate transistor 202 (e.g. if any current is generated) to generate "1" or "0", for the decoder 134 to perform decoding. Similarly, when the flash memory controller 110 needs to read the most significant bit (MSB) in the floating gate transistor 202, the flash memory controller 110 will use the reading voltages Vt3 and Vt7 to read the floating gate transistor 202, refer to the conduction state of the floating gate transistor 202 (e.g. if any current is generated or not) to determine whether the MSB is "1" or "0", for the decoder 134 to perform decoding. In this embodiment, when the floating gate transistor 202 has the writing voltage level L1, it can be called as having an erase state, and when the floating gate transistor 202 had any of the writing voltage levels L2-L8, it can be called as having a programming state.

It should be noted that the example shown in FIG. 3 is merely for illustrating the process of the flash memory controller reading the floating gate transistor 202, and the implementation manner is not meant to limit the scope of the present invention. Specifically, the aforementioned LSB, CSB and LSB may be encoded in different manners, and the flash memory controller may further use additional auxiliary voltages to read the floating gate memory 202 in order to provide more information for the decoder 134 to perform decoding. In addition, since one skilled in the art should be readily to realize how to apply the aforementioned embodiment to SLC, MLC and QLC blocks after reading the contents associated with FIG. 3, the details thereof are omitted here for brevity.

Because the flash memory module 120 may have the writing voltage levels (L1-L8) drift issue due to data retention, writing status, environmental factors, etc., the flash memory module 120 may not be read successfully by using the original reading voltage Vt1-Vt7. Therefore, the manufacturer of the flash memory module 120 usually provides multiple read retry tables 142, in which each read retry table 142 records at least one reading voltage, and any two reading voltages do not have exactly the same reading voltage, and the flash memory controller 110 can load the read retry tables 142 into the buffer memory 116 when booting to control the flash memory module 120 to use different reading voltages Vt1-Vt7 to read the flash memory module 120, to obtain data with better quality and the data can be successfully decoded.

As mentioned in the prior art, since the flash memory controller 110 includes multiple read retry tables 142, when the flash memory module 120 has writing voltage level drifting issue, if the multiple read retry tables 142 are sequentially used to read the flash memory module 120, it is often necessary to try multiple invalid read retry tables to read appropriate data. Therefore, the present invention establishes a classifying and sorting table 144 in the buffer memory 116, which is used to classify and sort multiple read retry tables 142, so that when the flash memory controller 110 needs to change the read retry table to read the flash memory module 120, it can first try the read retry table with a higher decoding success rate, so that the flash memory controller 110 can quickly find suitable reading voltages to improve system performance.

Figure 4:
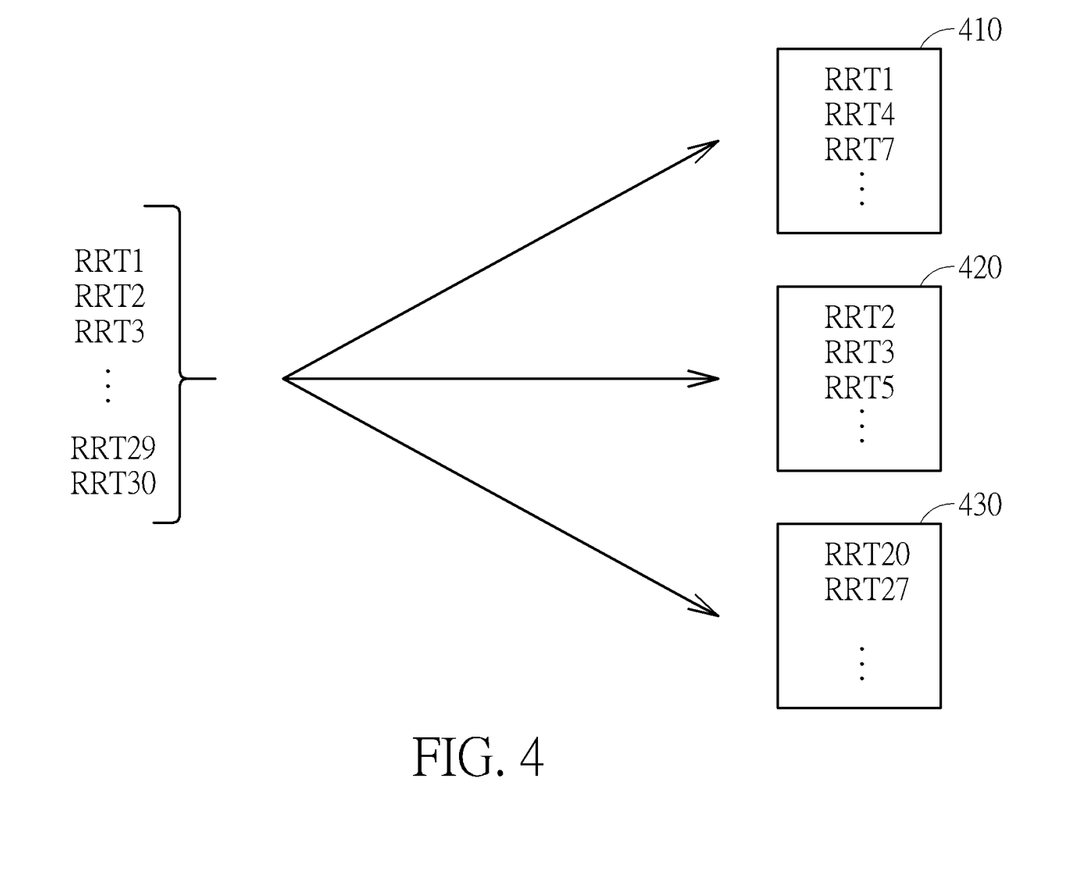
FIG. 4 is a diagram illustrating a classifying and sorting table according to one embodiment of the present invention.
Figure 5:
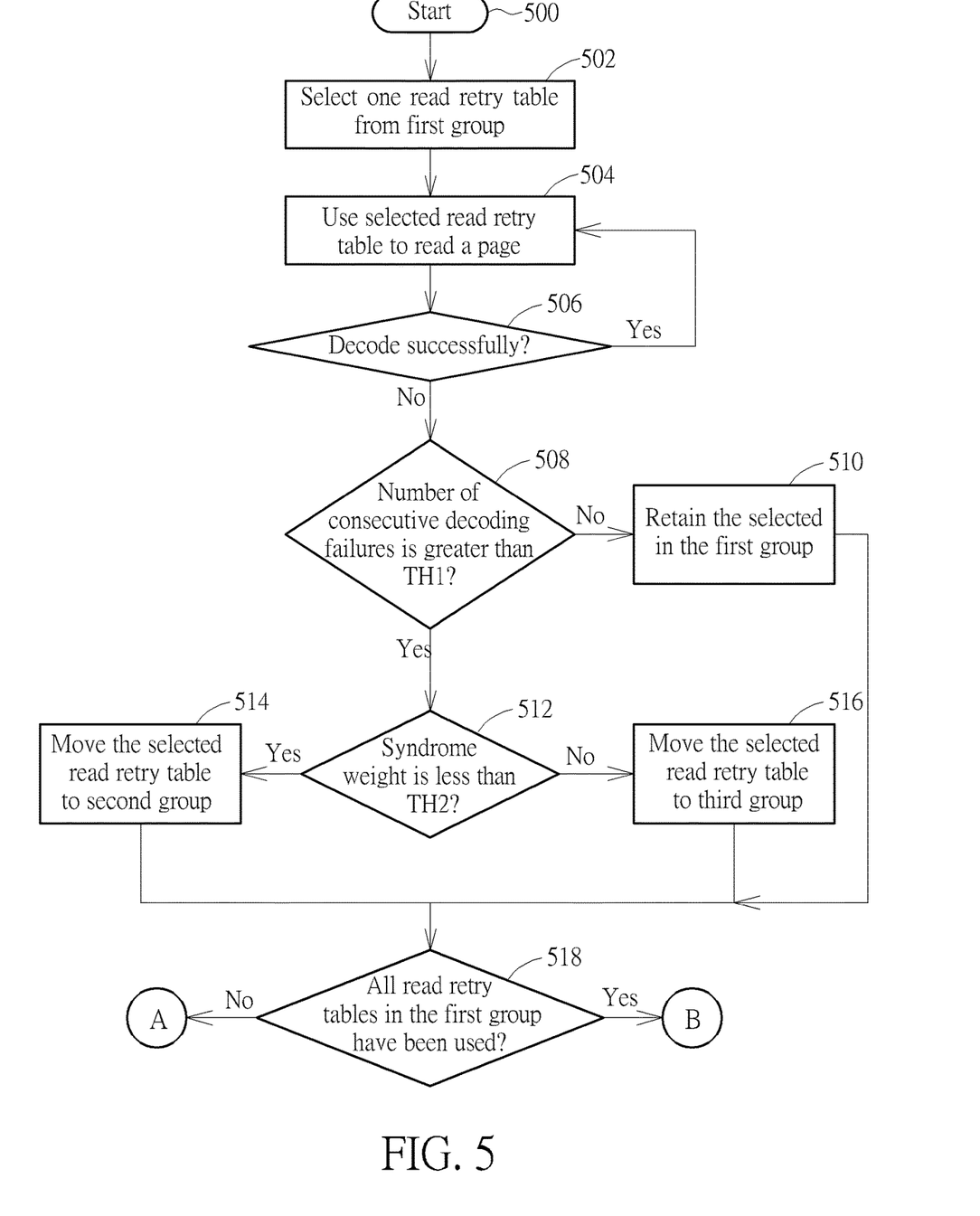
FIG. 5-FIG. 8 describe a flowchart of a method for accessing the flash memory module according to one embodiment of the present invention.
Figure 6:
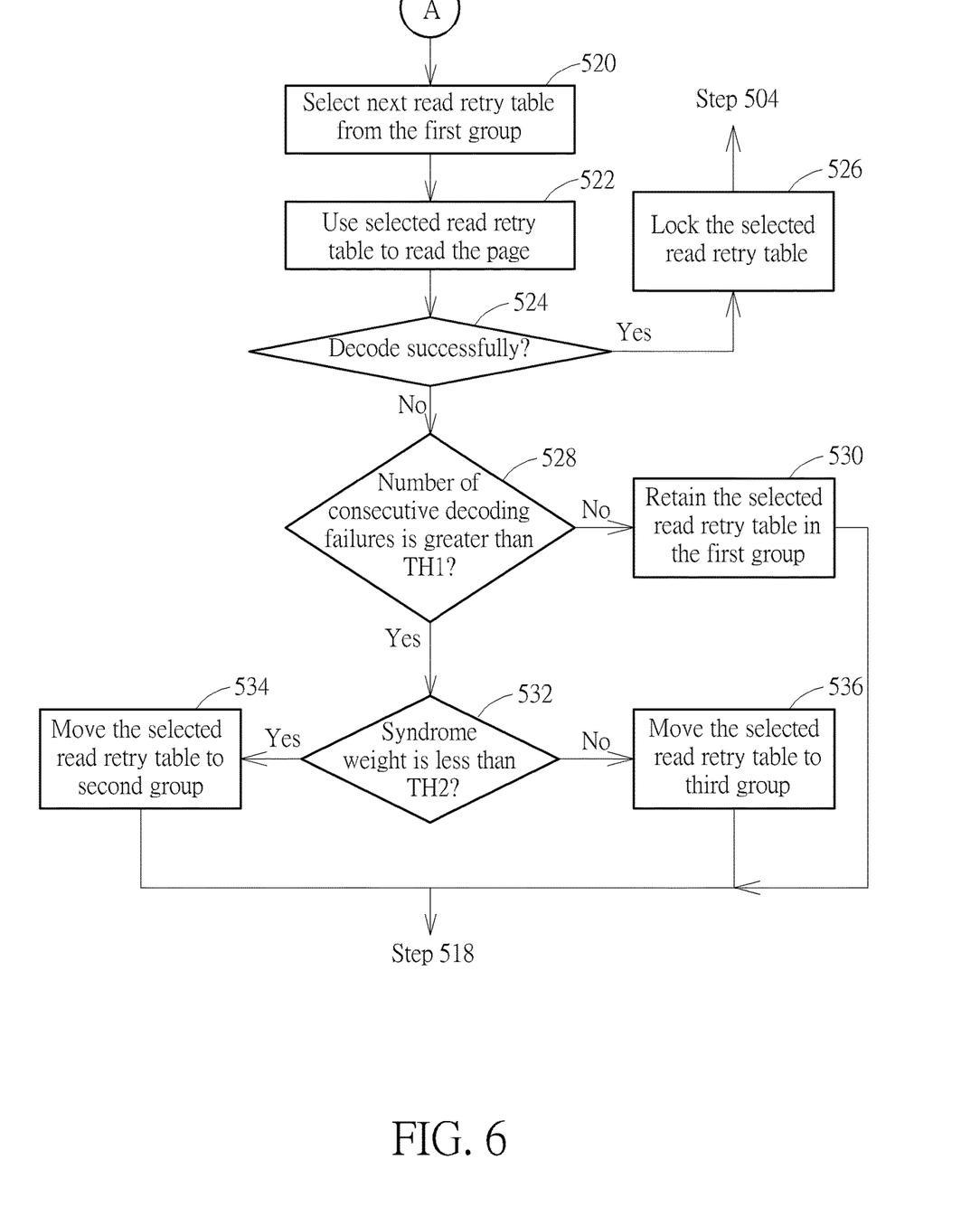
Figure 7:
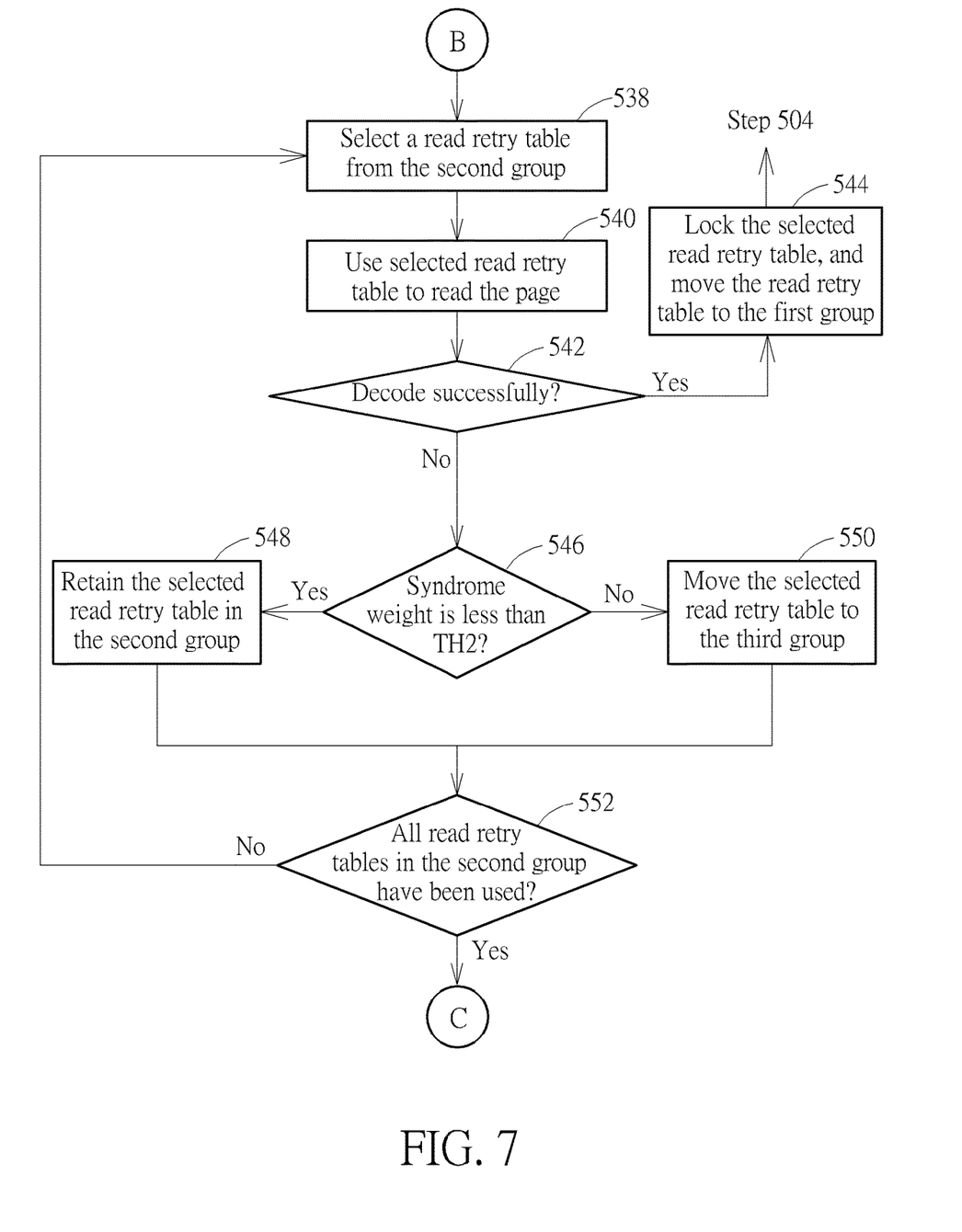
Figure 8:
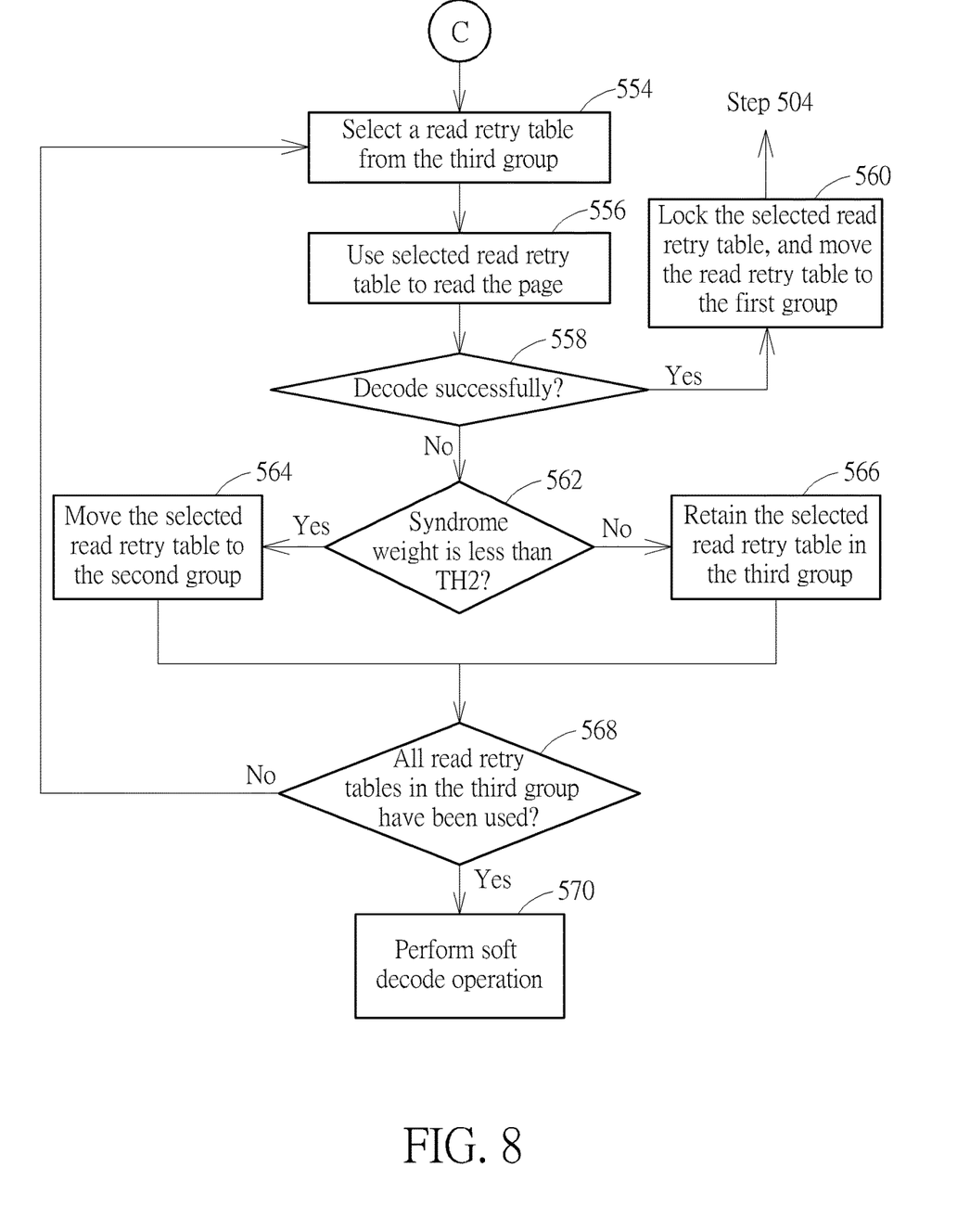

FIG. 4 is a diagram of the classifying and sorting table 144 according to one embodiment of the present invention. As shown in FIG. 4, it is assumed that the multiple read retry tables 142 include 30 read retry table RRT1-RRT30, and the flash memory controller 110 will classify and sort the read retry tables RRT1-RRT30 into a first group 410, a second group 420 and a third group 430 according to the decoding results of the data obtained by using the read retry tables RRT1-RRT30. In this embodiment, the first group 410 includes the read retry tables that have been used to read the flash memory module 120 and the data obtained can be successfully decoded by using a hard decoding method. For example, assume that the read retry tables RRT1, RRT4, and RRT7 have been used to read the flash memory module 120 before, and the read data can be decoded successfully by the decoder 134 using the hard decoding method, the read retry tables RRT1, RRT4, and RRT7 can be classified into the first group 410. The second group 420 includes the read retry tables that have been used to read the flash memory module 120 and the data obtained cannot be successfully decoded by using the hard decoding method, but a syndrome or a syndrome weight generated during the hard decoding process meets a first condition. For example, assuming that the read retry tables RRT2, RRT3, and RRT5 have been used to read the flash memory module 120 before, the read data cannot be decoded successfully by the decoder 134 using the hard decoding method, but the syndrome weight generated during the hard decoding process is lower than a threshold value, the read retry tables RRT2, RRT3, and RRT5 are classified into the second group 420. The third group 430 includes the read retry tables that have been used to read the flash memory module 120 and the data obtained cannot be successfully decoded by using the hard decoding method, but a syndrome or a syndrome weight generated during the hard decoding process meets a second condition. For example, assuming that the read retry tables RRT20 and RRT27 have been used to read the flash memory module 120 before, the read data cannot be decoded successfully by the decoder 134 using the hard decoding method, but the syndrome weight generated during the hard decoding process is greater than the threshold value, the read retry tables RRT20 and RRT27 are classified into the third group 430. It should be noted that the above-mentioned syndrome weight can be used to represent the quality of the data, where the smaller the syndrome weight, the better the quality of the data. In addition, since the contents and calculation methods of the above-mentioned syndrome and syndrome weight are already well known to a person skilled in the art, such as U.S. Patent Publication No. US2019/0158115 and Taiwan Patent No. TWI718060, the relevant calculation details are omitted here.

In one embodiment, the read retry tables included in the first group 410 can be further sorted. For example, the sorting is performed according to a bit error count of the data obtained by using each read retry table in the first group 410, wherein the read retry table corresponding to the smaller bit error count has a higher priority sequence number. Specifically, when the flash memory controller 110 uses a read retry table to read a page of the flash memory module 120, during the process that the decoder 134 successfully decode the read data, a bit error count of the read data can be obtained, and the bit error count is used as the corresponding bit error count of the read retry table. It should be noted that the corresponding bit error count of the read retry table is constantly updated, that is, the corresponding bit error count of the read retry table is generated in the last time the read retry table was used to read the flash memory module 120.

In one embodiment, the read retry tables included in the second group 420 can be further sorted. For example, the sorting is performed according to a syndrome weight of the data obtained by using each read retry table in the second group 420, wherein the read retry table corresponding to the smaller syndrome weight has a higher priority sequence number. Specifically, when the flash memory controller 110 uses a read retry table to read a page of the flash memory module 120, during the process that the decoder 134 fails to decode the read data, a syndrome weight of the read data can be obtained, and the syndrome weight is used as the corresponding syndrome weight of the read retry table. It should be noted that the corresponding syndrome weight of the read retry table is constantly updated, that is, the corresponding syndrome weight of the read retry table is generated in the last time the read retry table was used to read the flash memory module 120.

In one embodiment, the number of read retry tables in the first group 410, the second group 420 and the third group 430 will change with the operation of the memory device 100, and each read retry table may also be classified into different groups according to the operation of the memory device 100.

For example, when any read retry table in the first group 410 is used to read the flash memory module 120, but the read data cannot be successfully decoded by the decoder 134 using the hard decoding method, and when the number of times that the read data cannot be successfully decoded reaches A times, the read retry table will be classified into the second group 420 or the third group 430 according to the corresponding syndrome weight, where A can be any suitable positive integer such as 1, 2 or 3. In one embodiment, when any read retry table in the second group 420 or the third group 430 is used to read the flash memory module 120, and the read data can be successfully decoded by the decoder 120 using the hard decoding method, the read retry table will be classified into the first group 410. In one embodiment, when any read retry table in the second group 420 is used to read the flash memory module 120, the read data cannot be successfully processed by the decoder 120, and the corresponding syndrome weight is not lower than the threshold value, the read retry table will be classified into the third group 430. In one embodiment, when any read retry table in the third group 430 is used to read the flash memory module 120, the read data cannot be successfully processed by the decoder 120, and the corresponding syndrome weight is lower than the threshold value, the read retry table will be classified into the second group 420.

By classifying the read retry table into multiple groups, and using the classifying and sorting table 144 to record the read retry tables in the first group 410, the second group 420 and the third group 430, which allows the flash memory controller 110 to select a better read retry table for subsequent read operations when the decoder 134 fails to decode, so as to avoid using too many invalid read retry tables and reducing overall performance. Specifically, assume that the flash memory controller 110 uses the read retry table RRT1 to read the flash memory module 120, and if at a certain moment the decoder 134 cannot use the hard decoding method to decode the data successfully, the flash memory controller 110 will give priority to the read retry table in the first group 410, that is, the read retry table RRT4 is used to read the flash memory module 120. If the read data generated by using the read retry table RRT4 to read the flash memory module 120 can be successfully decoded by the decoder 134, the flash memory controller 110 will use the read retry table RRT4 to perform the subsequent reading operation. If the read data generated by using the read retry table RRT4 to read the flash memory module 120 cannot be successfully decoded by the decoder 134, the flash memory controller 110 will try the other read retry table such as RRT7 in the first group 410. In addition, if all the read data generated by the read retry table(s) in the first group 410 cannot be successfully decoded by the decoder 134, the flash memory controller 110 will select the read try table(s) from the second group 420 in sequence, or select the read try table(s) from the third group 430 in sequence, until the obtained read data can be successfully decoded by the decoder 134.

FIG. 5-FIG. 8 describe a flowchart of a method for accessing the flash memory module according to one embodiment of the present invention. In Step 500, the flow starts, and the microprocessor 112 has classified multiple read retry tables 142, and the classifying and sorting table 144 has included the first group 410, the second group 420 and the third group 430, where the classifying and sorting table 144 at this time may be a default classifying and sorting table 144, or generated through a previous operation. In Step 502, the microprocessor 112 selects a read retry table from the first group 410, such as the read retry table RRT1 shown in FIG. 4, where the read retry table RRT1 is the read retry table that the microprocessor 112 used to read the flash memory module 120 last time and the read data can be successfully decoded by the decoder 134. In Step 504, the microprocessor 112 uses the selected read retry table RRT1 to read a page of a block in the flash memory module 120 to obtain read data. In Step 506, the decoder 134 performs hard decoding on the read data. If the decoding is successful, the flow goes back to Step 504 to continue to use the read retry table RRT1 to read the next page of the block; and if the decoding is failed, the flow enters Step 508. In Step 508, the microprocessor 112 determines whether the number of consecutive decoding failures corresponding to the read retry table RRT1 is greater than a threshold value TH1, if not, the flow enters Step 510; and if yes, the flow enters Step 512. In this embodiment, "consecutive decoding failures" means that the read data cannot be decoded when the read retry table RRT1 was used to read another page of the flash memory module 120, but does not have to be continuous in read time. In addition, the threshold value TH1 can be any suitable positive integer such as 1, 2 or 3. In step 510, the microprocessor 112 retains the read retry table RRT1 in the first group 410. In Step 512, the microprocessor 112 determines whether the syndrome weight of the read data is less than a threshold value TH2, if yes, the flow enters Step 514; and if not, the flow enters Step 516. In Step 514, the microprocessor 112 moves the read retry table RRT1 from the first group 410 to the second group 420. In Step 516, the microprocessor 112 moves the read retry table RRT1 from the first group 410 to the third group 430. In Step 518, the microprocessor 112 determines whether all read retry tables in the first group 410 have been used to read the page of the block in the flash memory module 120, if not, the flow enters Step 520; and if yes, the flow enters Step 538.

In Step 520, the microprocessor 112 selects the next read retry table from the first group 410, such as the read retry table RRT4 shown in FIG. 4. In Step 522, the microprocessor 112 uses the selected read retry table RRT4 to read the page of the block in the flash memory module 120 to obtain read data, wherein Step 522 and Step 504 read the same page. In Step 524, the decoder 134 performs hard decoding on the read data. If the decoding is successful, the flow enters Step 526; and if the decoding fails, the flow enters Step 528. In step 526, the microprocessor 122 locks the selected read retry table RRT4 (i.e., read retry table RRT4 becomes a default read retry table), and the flow goes back to Step 504 to continue using the read retry table RRT4 to read subsequent page(s) in the flash memory module 120. In Step 528, the microprocessor 112 determines whether the number of consecutive decoding failures corresponding to the read retry table RRT4 is greater than the threshold value TH1, if not, the flow enters Step 530; and if yes, the flow enters Step 532. In this embodiment, "consecutive decoding failures" means that the read data cannot be decoded when the read retry table RRT4 was used to read another page of the flash memory module 120, but does not have to be continuous in read time. In Step 530, the microprocessor 112 retains the selected read retry table RRT4 in the first group 410. In Step 532, the microprocessor 112 determines whether the syndrome weight of the read data is less than the threshold value TH2, if yes, the flow enters Step 534; and if not, the flow enters Step 536. In Step 534, the microprocessor 112 moves the read retry table RRT4 from the first group 410 to the second group 420. In Step 536, the microprocessor 112 moves the read retry table RRT4 from the first group 410 to the third group 430. Then, the flow goes back to Step 518.

In Step 538, the microprocessor 112 selects a read retry table from the second group 420, such as the read retry table RRT2 shown in FIG. 4. In Step 540, the microprocessor 112 uses the selected read retry table RRT2 to read the page of the block in the flash memory module 120 to obtain read data, wherein Step 540 and Step 504 read the same page. In Step 542, the decoder 134 performs hard decoding on the read data. If the decoding is successful, the flow enters Step 544; and if the decoding fails, the flow enters Step 546. In Step 544, the microprocessor 122 locks the selected read retry table RRT2 (i.e., read retry table RRT2 becomes a default read retry table), and the flow goes back to Step 504 to continue using the read retry table RRT2 to read subsequent page(s) in the flash memory module 120, and the read retry table RRT2 is moved from the second group 420 to the first group 410. In Step 546, the microprocessor 112 determines whether the syndrome weight of the read data is less than the threshold value TH2. If yes, the flow enters Step 548; and if not, the flow enters Step 550. In Step 548, the microprocessor 112 retains the read retry table RRT2 in the second group 420. In Step 550, the microprocessor 112 moves the read retry table RRT2 from the second group 420 to the third group 430. In Step 552, the microprocessor 112 determines whether all read retry tables in the second group 420 have been used to read the page of the block in the flash memory module 120, if yes, the flow enters Step 554; and if not, the flow goes back to Step 538.

In Step 554, the microprocessor 112 selects a read retry table from the third group 430, such as the read retry table RRT20 shown in FIG. 4. In Step 556, the microprocessor 112 uses the selected read retry table RRT20 to read the page of the block in the flash memory module 120 to obtain read data, wherein Step 556 and Step 504 read the same page. In Step 558, the decoder 134 performs hard decoding on the read data. If the decoding is successful, the flow enters Step 560; and if the decoding fails, the flow enters Step 562. In Step 560, the microprocessor 122 locks the selected read retry table RRT20 (i.e., read retry table RRT20 becomes a default read retry table), and the flow goes back to Step 504 to continue using the read retry table RRT20 to read subsequent page(s) in the flash memory module 120, and the read retry table RRT20 is moved from the third group 430 to the first group 410. In Step 562, the microprocessor 112 determines whether the syndrome weight of the read data is less than the threshold value TH2. If yes, the flow enters Step 564; and if not, the flow enters Step 566. In Step 564, the microprocessor 112 moves the read retry table RRT20 from the third group 430 to the second group 420. In Step 566, the microprocessor 112 retains the read retry table RRT20 in the third group 430. In Step 568, the microprocessor 112 determines whether all read retry tables in the third group 568 have been used to read the page of the block in the flash memory module 120, if yes, the flow enters Step 570; and if not, the flow goes back to Step 554. In Step 570, since the read data of all the read retry tables cannot be decoded successfully through hard decoding, the decoder 134 starts to perform a soft decoding operation, that is, using other auxiliary read voltages to read the page of this block to obtain channel information for LDPC soft decoding operations.

As described in the above embodiments, by classifying the multiple read retry tables into the first group 410, the second group 420 and the third group 430, the flash memory controller 110 can be configured to select the read retry table from the first group 410, the second group 420 and the third group 430 in sequence to perform subsequent read operations when the decoder 134 fails to decode the read data. Since the flash memory controller 110 will preferentially select a better read retry table, it can avoid using too many invalid read retry tables and reducing overall performance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A flash memory controller, wherein the flash memory controller is configured to access a flash memory module, and the flash memory controller comprises:
   a read-only memory, configured to store a program code;
   a microprocessor, configured to execute the program code to control access of the flash memory module;
   a decoder; and
   a buffer memory, configured to store multiple read retry tables, wherein each of the multiple read retry tables records at least one reading voltage, and any two read retry tables do not have exactly the same reading voltage;
   wherein the microprocessor classifies the multiple read retry tables into at least a first group and a second group to establish a classifying and sorting table, wherein the first group comprise the read retry table(s) that are previously used to read the flash memory module to obtain read data, and the read data can be successfully decoded by the decoder; and the second group comprises the read retry table(s) that that are previously used to read the flash memory module to obtain read data, and the read data is failed to be successfully decoded by the decoder, and a syndrome or a syndrome weight generated during a decoding process of the decoder meets a first condition;
   wherein the microprocessor selects a first read retry table from the first group to read a page of a block of the flash memory module to generate first read data, and when the decoder fails to decode the first read data, the microprocessor selects a second read retry table from the first group to read the page of the block of the flash memory module to generate second read data, for the decoder to decode.

2. The flash memory controller of claim 1, wherein the microprocessor classifies the multiple read retry tables into the first group, the second group and a third group to establish the classifying and sorting table, wherein the third group comprises the read retry table(s) that that are previously used to read the flash memory module to obtain read data, and the read data is failed to be successfully decoded by the decoder, and the syndrome or the syndrome weight generated during the decoding process of the decoder meets a second condition.

3. The flash memory controller of claim 2, wherein the second group comprises the read retry table(s) that that are previously used to read the flash memory module to obtain the read data, and the read data is failed to be successfully decoded by the decoder, and the syndrome weight generated during the decoding process of the decoder is less than a threshold; and the third group comprises the read retry table(s) that that are previously used to read the flash memory module to obtain the read data, and the read data is failed to be successfully decoded by the decoder, and the syndrome weight generated during the decoding process of the decoder is not less than the threshold.

4. The flash memory controller of claim 2, wherein when the decoder fails to decode the second read data and all read retry tables in the first group have been used to read the page of the block of the flash memory module, the microprocessor selects a third read retry table from the second group to read the page of the block of the flash memory module to generate third read data for the decoder to decode.

5. The flash memory controller of claim 4, wherein when the decoder successfully decodes the third read data, the microprocessor moves the third read retry table from the second group to the first group, and the microprocessor continues to use the third read retry table to read a next page of the block of the flash memory module.

6. The flash memory controller of claim 4, wherein when the decoder fails to decode the third read data and all read retry tables in the second group have been used to read the page of the block of the flash memory module, the microprocessor selects a fourth read retry table from the third group to read the page of the block of the flash memory module to generate fourth read data for the decoder to decode.

7. The flash memory controller of claim 6, wherein when the decoder successfully decodes the fourth read data, the microprocessor moves the fourth read retry table from the third group to the first group, and the microprocessor continues to use the fourth read retry table to read a next page of the block of the flash memory module.

8. The flash memory controller of claim 1, wherein the microprocessor sorts each read retry table in the first group according to a bit error count corresponding to the read retry table, the read retry table corresponding to the smaller syndrome weight has a higher priority sequence number; and the microprocessor sorts each read retry table in the second group according to the syndrome weight corresponding to the read retry table, the read retry table corresponding to the smaller syndrome weight has a higher priority sequence number.

9. An electronic device, comprising:
a flash memory module; and
a flash memory controller configured to access the flash memory module, wherein the flash memory controller comprises a decoder, the flash memory controller records multiple read retry tables, each of the multiple read retry tables records at least one reading voltage, and any two read retry tables do not have exactly the same reading voltage;
wherein the flash memory controller classifies the multiple read retry tables into at least a first group and a second group to establish a classifying and sorting table, wherein the first group comprise the read retry table(s) that are previously used to read the flash memory module to obtain read data, and the read data can be successfully decoded by the decoder; and the second group comprises the read retry table(s) that that are previously used to read the flash memory module to obtain read data, and the read data is failed to be successfully decoded by the decoder, and a syndrome or a syndrome weight generated during a decoding process of the decoder meets a first condition;
wherein the flash memory controller selects a first read retry table from the first group to read a page of a block of the flash memory module to generate first read data, and when the decoder fails to decode the first read data, the flash memory controller selects a second read retry table from the first group to read the page of the block of the flash memory module to generate second read data, for the decoder to decode.

10. The electronic device of claim 9, wherein the flash memory controller classifies the multiple read retry tables into the first group, the second group and a third group to establish the classifying and sorting table, wherein the third group comprises the read retry table(s) that that are previously used to read the flash memory module to obtain read data, and the read data is failed to be successfully decoded by the decoder, and the syndrome or the syndrome weight generated during the decoding process of the decoder meets a second condition.

11. The electronic device of claim 10, wherein the second group comprises the read retry table(s) that that are previously used to read the flash memory module to obtain the read data, and the read data is failed to be successfully decoded by the decoder, and the syndrome weight generated during the decoding process of the decoder is less than a threshold; and the third group comprises the read retry table(s) that that are previously used to read the flash memory module to obtain the read data, and the read data is failed to be successfully decoded by the decoder, and the syndrome weight generated during the decoding process of the decoder is not less than the threshold.

12. A method for accessing a flash memory module, comprising:
classifying multiple read retry tables into at least a first group and a second group to establish a classifying and sorting table, wherein each of the multiple read retry tables records at least one reading voltage, and any two read retry tables do not have exactly the same reading voltage; the first group comprise the read retry table(s) that are previously used to read the flash memory module to obtain read data, and the read data can be successfully decoded by a decoder; and the second group comprises the read retry table(s) that that are previously used to read the flash memory module to obtain read data, and the read data is failed to be successfully decoded by the decoder, and a syndrome or a syndrome weight generated during a decoding process of the decoder meets a first condition;
selecting a first read retry table from the first group to read a page of a block of the flash memory module to generate first read data; and
when the decoder fails to decode the first read data, selecting a second read retry table from the first group to read the page of the block of the flash memory module to generate second read data, for the decoder to decode.

13. The method of claim 12, wherein the flash memory controller classifies the multiple read retry tables into the first group, the second group and a third group to establish the classifying and sorting table, wherein the third group comprises the read retry table(s) that that are previously used to read the flash memory module to obtain read data, and the read data is failed to be successfully decoded by the decoder, and the syndrome or the syndrome weight generated during the decoding process of the decoder meets a second condition.

14. The method of claim 13, wherein the second group comprises the read retry table(s) that that are previously used to read the flash memory module to obtain the read data, and the read data is failed to be successfully decoded by the decoder, and the syndrome weight generated during the decoding process of the decoder is less than a threshold; and the third group comprises the read retry table(s) that that are previously used to read the flash memory module to obtain the read data, and the read data is failed to be successfully decoded by the decoder, and the syndrome weight generated during the decoding process of the decoder is not less than the threshold.

* * * * *